(12) United States Patent
Watanabe et al.

(10) Patent No.: US 8,141,448 B2
(45) Date of Patent: Mar. 27, 2012

(54) BALL SPLINE

(75) Inventors: Hajime Watanabe, Kashiwara (JP);
Tomoyuki Aida, Kashihara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 115 days.

(21) Appl. No.: 12/289,683

(22) Filed: Oct. 31, 2008

(65) Prior Publication Data
US 2009/0116770 A1 May 7, 2009

(30) Foreign Application Priority Data

Nov. 2, 2007 (JP) ................................ P2007-285697

(51) Int. Cl.
*F16H 55/02* (2006.01)
(52) U.S. Cl. ...................................... 74/424.81
(58) Field of Classification Search ............... 74/424.71, 74/424.81, 424.82, 424.83, 424.87; 384/43, 384/44

See application file for complete search history.

(56) References Cited

U.S. PATENT DOCUMENTS

| | | | |
|---|---|---|---|
| 2,945,366 A | 7/1960 | Sears | |
| 3,494,148 A | 2/1970 | Young | |
| 4,629,337 A * | 12/1986 | Teramachi | 384/43 |
| 4,655,611 A * | 4/1987 | Kondo | 384/45 |
| 4,764,032 A * | 8/1988 | Tanaka | 384/44 |
| 4,945,779 A * | 8/1990 | Williams | 74/99 R |
| 5,121,647 A | 6/1992 | Teramachi | |
| 5,554,899 A | 9/1996 | Teramachi | |

FOREIGN PATENT DOCUMENTS

GB 1 216 142 12/1970
JP 63-231056(A) 9/1998

OTHER PUBLICATIONS

European Search Report dated Jul. 21, 2009.
European Office Action dated Feb. 25, 2011.
Japanese Office Action dated Oct. 6, 2011 with an English translation thereof.

* cited by examiner

*Primary Examiner* — Vicky Johnson
(74) *Attorney, Agent, or Firm* — McGinn IP Law Group, PLLC

(57) ABSTRACT

First shoulder portions are formed on the outer periphery of the shaft such that the first spline grooves are interposed between the first shoulder portions adjacent to each other in a circumferential direction of the shaft. Second shoulder portions are formed on the inner periphery of the outer tube such that the second spline grooves are interposed between the second shoulder portions adjacent to each other in a circumferential direction of the outer tube. Main passages of spline-purpose ball circulation passages are formed with the first and second shoulder portions. Clearance are formed respectively between the first and second shoulder portions and the spline-purpose balls in a rotational direction of the screw shaft and the spline-purpose outer tube. The spline-purpose balls disposed in the main passages bear a clockwise torque and a counterclockwise torque transmitted between the screw shaft and the spline-purpose outer tube.

9 Claims, 5 Drawing Sheets

BALL SPLINE

BACKGROUND OF THE INVENTION

1. Field of the Invention

This invention relates to a ball spline, and more particularly to a ball spline suited for use in a ball spline-equipped ball screw.

2. Related Art

There is known one conventional ball spline-equipped ball screw comprising a screw shaft having a screw groove and a plurality of axially-extending linear spline grooves formed in an outer peripheral surface thereof, a screw-purpose nut having the screw shaft passed therethrough and including a screw-purpose ball circulation passage corresponding to the screw groove of the screw shaft, a spline-purpose outer tube having the screw shaft passed therethrough and including spline-purpose ball circulation passages corresponding to the spline grooves of the screw shaft, a plurality of screw-purpose balls provided in the screw-purpose ball circulation passage of the screw-purpose nut, and a plurality of spline-purpose balls provided in the spline-purpose ball circulation passages of the spline-purpose outer tube (see JP-A-6-300106).

The ball spline portion serves to bear a torque acting in a rotational direction, and in the conventional ball spline, for example, three of six rows of main passages bear a torque acting in a clockwise direction, whereas the other three rows of main passages bear a torque acting in a counterclockwise direction.

Namely, as shown in FIG. 5, a conventional ball spline 41 comprises a screw shaft 42 having a plurality of axially-extending linear spline grooves 43 formed in an outer peripheral surface thereof, a spline-purpose outer tube 44 having the screw shaft 42 passed therethrough and including spline-purpose ball circulation passages corresponding to the spline grooves 43 of the screw shaft 42, a plurality of spline-purpose balls 45 provided in the spline-purpose ball circulation passages of the spline-purpose outer tube 44, and a cage 53. The spline-purpose ball circulation passages are formed by respective main passages 46A and 46B (in which the spline-purpose balls 45 roll) and respective return passages 47 each communicating with opposite end portions of the corresponding main passage 46A, 46B.

The main passages 46A and 46B of the spline-purpose ball circulation passages are arranged such that each first main passage 46A for bearing a clockwise torque and the adjacent second main passage 46B for bearing a counterclockwise torque make a pair. Namely, shoulder portions 48 each interposed between the corresponding pair of first and second main passages 46A and 46B are formed on the outer periphery of the screw shaft 42. Further, shoulder portions 49 each opposed to the corresponding first main passage 46A from the counterclockwise direction are formed on the inner periphery of the spline-purpose outer tube 44, and also shoulder portions 50 each opposed to the corresponding second main passage 46B from the clockwise direction are formed on the inner periphery of the outer tube 44. With this construction, the spline-purpose balls 45 disposed in the first main passages 46A bear a clockwise torque, and the spline-purpose balls 45 disposed in the second main passages 46B bear a counterclockwise torque. Further, shoulder portions 51 each interposed between the corresponding pair of first and second main passages 46A and 46B are formed on the inner periphery of the spline-purpose outer tube 44, and each shoulder portion 51 is opposed to a corresponding spline groove 52 (formed in the inner periphery of the spline-purpose outer tube 44) such that a clearance is formed between the shoulder portion 51 and the spline-purpose balls 45.

As a result, when a force acting in the clockwise direction is applied to the nut 44, the balls 45 indicated by A in FIG. 5 bear this torque, and these balls will not bear a torque when a force acting in the counterclockwise direction is applied to the nut 44. When a force acting in the counterclockwise direction is applied to the nut 44, the balls 45 indicated by B in FIG. 5 bear this torque, and these balls will not bear a torque when a force acting in the clockwise direction is applied to the nut 44. The balls 45 disposed in the return passages 47 do not bear the clockwise torque and the counterclockwise torque.

In the ball spline-equipped ball screw employing the torque bearing structure shown in FIG. 5, there has been encountered a problem that a torque capacity is small, and therefore it has been required to increase the torque capacity without increasing the diameter of the shaft.

SUMMARY OF THE INVENTION

It is an object of this invention to solve the above problem, and more specifically to provide a ball spline in which a torque capacity can be increased without increasing a diameter of a shaft.

According to the present invention, there is provided a ball spline comprising:

a shaft having a plurality of axially-extending linear first spline grooves formed in an outer peripheral surface thereof;

an outer tube having the shaft passed therethrough and including second spline grooves corresponding to the first spline grooves of the shaft; and a plurality of balls disposed between the shaft and the outer tube, wherein ball circulation passages in which the balls are disposed are formed between the shaft and the outer tube by a plurality of main passages and return passages communicating with opposite end portions of the main passages, first shoulder portions are formed on the outer periphery of the shaft such that the first spline grooves of the shaft are interposed between the first shoulder portions adjacent to each other in a circumferential direction of the shaft, and second shoulder portions are formed on the inner periphery of the outer tube such that the second spline grooves of the outer tube are interposed between the second shoulder portions adjacent to each other in a circumferential direction of the outer tube, and the first and second shoulder portions and the balls are arranged such that clearances are formed respectively between the first shoulder portions and the balls and between the second shoulder portions and the balls in a rotational direction of the shaft and the outer tube, and the balls disposed in all of the main passages bear a clockwise torque and a counterclockwise torque transmitted between the shaft and the outer tube.

In the conventional construction, for example, three of six rows of main passages bear a clockwise torque, whereas the other three rows of main passages bear a counterclockwise torque. On the other hand, in the present invention, all of six rows of main passages bear a clockwise torque and a counterclockwise torque, and therefore the torque capacity is twice larger than that of the conventional construction, and thus the torque capacity can be increased without increasing the shaft diameter. Preferably, the main passages, as well as the return passages, are provided in a plurality of rows (for example, six row or eight rows).

As a construction for bearing torques in both directions, there is known a four point contact construction (in which no clearance is formed at opposite sides (clockwise side and counterclockwise side) of balls, and each ball contacts both of a shaft and a nut at its opposite sides spaced from each other in the circumferential direction). This four point contact construction is not suitable since the balls are liable to slip, and therefore instead of using this construction, a curvature (raceway curvature) of the spline grooves of the shaft, as well as a curvature (raceway curvature) of the spline grooves of the spline-purpose outer tube, are increased (for example, a radius of curvature in cross section of the spline grooves is set to 53% or more of the ball diameter), and negative clearances will not be formed (each clearance is about 5 μm), and with this construction the slip of the balls are prevented, and the life of the ball spline is prolonged.

Preferably, portions of the return passages that are in parallel to the main passages are provided so as to be interposed between the first shoulder portions adjacent to each other in the circumferential direction of the shaft and between the second shoulder portions adjacent to each other in the circumferential direction of the outer tube, and the clearances formed between the second shoulder portions and the balls in the rotational direction in the return passages are made larger than the clearances formed in the main passages in the rotational direction so that the balls disposed in the return passages bear an excessive torque. With this construction, the circulating balls (which have not heretofore borne the torque in the conventional construction) in the return passages bear the torque. Namely, in the conventional construction, the return passages are larger in diameter than the main passages. On the other hand, in the present invention, the return passages are equal in diameter to the main passages, and each mating pair of shoulder portions are opposed to each other with the return passage interposed therebetween as described above for the shoulder portions for the main passages. The clearances in each return passage are so determined that the circulating balls in the return passages will not bear an ordinary torque but can bear an excessive torque. With this construction, when the deformation (elastic deformation) of the balls in the main passages increases, the circulating balls can bear the torque, and by doing so, a force which will damage or break the balls in the main passages is prevented from acting on these balls.

In the above ball spline, the shaft has a screw groove formed in the outer peripheral surface thereof, and a screw-purpose nut is fitted on the shaft, and has a screw-purpose ball circulation passage corresponding to the screw groove, and a plurality of balls are disposed in the screw-purpose ball circulation passage of the screw-purpose nut. This structure is suitably used as a ball spline-equipped ball screw.

In the ball spline of the present invention, the torque can be borne by the rows of main passages twice larger in number than those of the conventional construction, and therefore the torque capacity is twice larger, and thus the torque capacity can be increased without increasing the shaft diameter, so that the life of the ball spline is prolonged.

DETAILED DESCRIPTION OF THE PREFERRED EMBODIMENTS

A preferred embodiment of the present invention will now be described with reference to the drawings.

Figure 1:
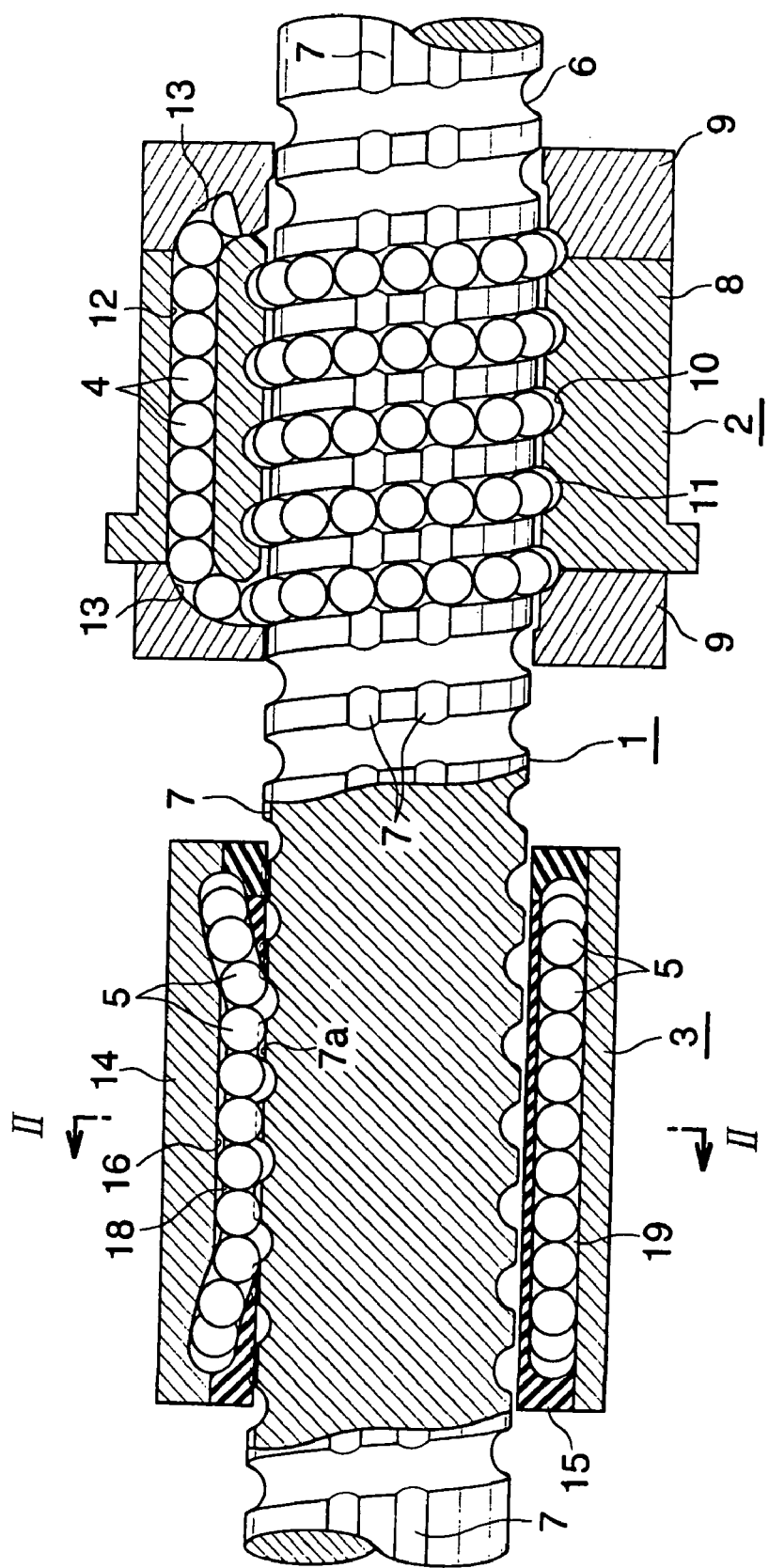
FIG. 1 is a longitudinal cross-sectional view showing a main portion of a first embodiment of a ball spline-equipped ball-screw of the present invention.
Figure 2:
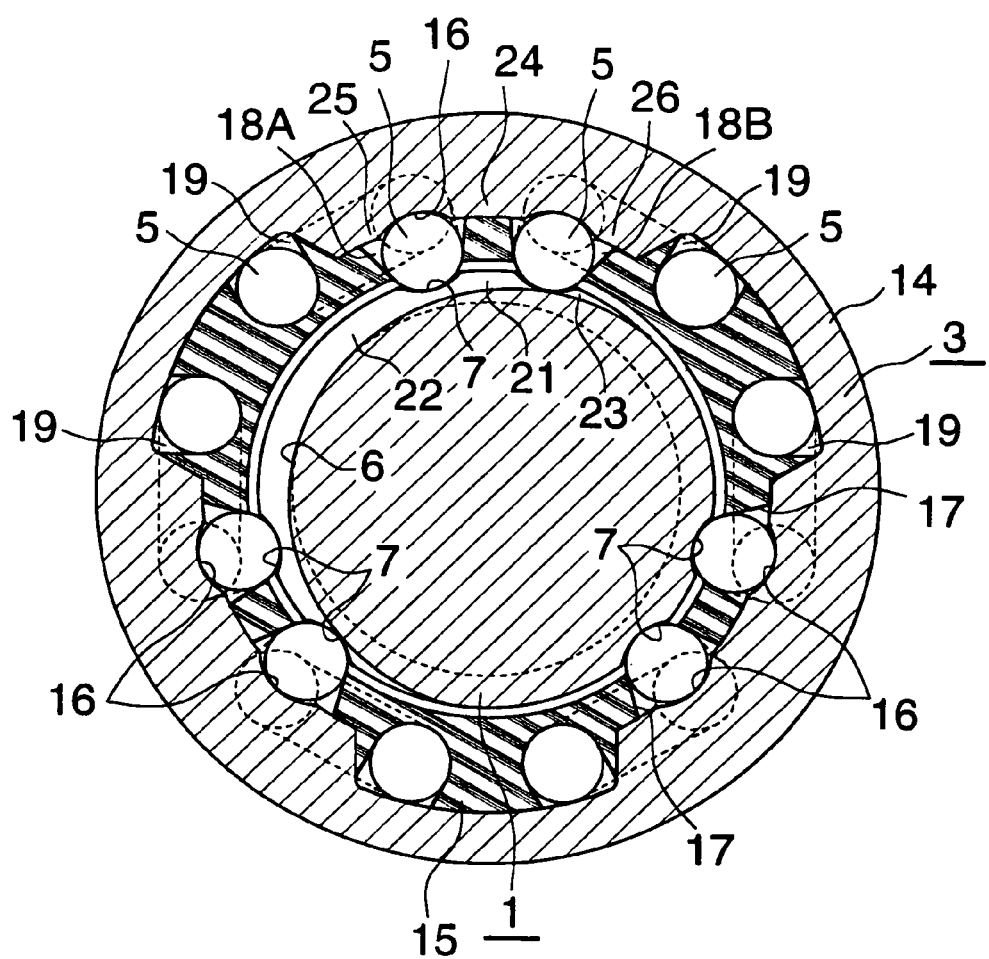
FIG. 2 is an enlarged cross-sectional view taken along the line II-II of FIG. 1.

FIG. 1 is a longitudinal cross-sectional view showing a main portion of a first embodiment of a ball spline-equipped ball screw of the invention, and FIG. 2 is an enlarged transverse cross-sectional view of the ball screw of FIG. 1. In the following description, a left-right direction corresponds to a left-right direction in the drawings.

The ball spline-equipped ball screw comprises a screw shaft 1 made of steel and extending in the left-right direction, a screw-purpose nut 2, a spline-purpose outer tube 3, a number of screw-purpose balls 4, and a number of spline-purpose balls 5.

The screw shaft 1 is a solid shaft having a round transverse cross-section, and a single thread groove (external thread groove) 6 is formed in an outer-peripheral surface of the screw shaft 1, and also a plurality of linear spline grooves 7 (first spline grooves) extending in an axial direction (right-left direction) are formed in this outer peripheral surface.

The screw-purpose nut 2 comprises a metallic nut body 8 of a cylindrical shape, and a pair of annular end caps 9 made of a synthetic resin and mounted respectively on opposite end faces of the nut body 8. The two end caps 9 comprise respective annular members (i.e., short cylindrical members) identical in shape to each other, and are fixed respectively to the axially-opposite end faces of the nut body 8 by fastening means (not shown) such as bolts. The nut 2 is fitted on the outer periphery of the screw shaft 1 with a slight radial clearance formed therebetween.

A single thread groove (internal thread groove) 10 corresponding to the external thread groove 6 is formed in an inner peripheral surface of the nut body 5. A space formed between the internal thread groove 10 of the nut body 8 and the external thread groove 6 of the screw shaft 1 (which are opposed to each other) defines a main passage 11 in which the screw-purpose balls 4 rolls. A return passage 12 is formed in a portion of a peripheral wall of the nut body 8. The return passage 12 comprises a though hole of a round cross-section extending through the nut body 8 in the axial direction over the entire length thereof.

Groove-like change-direction passages 13 communicating the main passage 11 and the return passage 12 are formed respectively in those end faces of the end caps 9 facing the nut body 8.

The screw-purpose balls 4 are disposed in the main passage 11, the return passage 12 and the change-direction passages 13, and the screw-purpose balls 4 rolling in the main passage 11 guide a relative rotation of the screw shaft 1 and the screw-purpose nut 2. A screw-purpose ball circulation passage is formed by the main passage 11, the return passage 12 and the change-direction passages 13.

The spline-purpose outer tube 3 comprises a metallic outer tube body 14 of a generally cylindrical shape, and a cage 15 of a generally cylindrical shape fixed to an inner periphery of the outer tube body 14. The outer tube 3 is fitted on the outer periphery of the screw shaft 1 with a slight radial clearance formed therebetween.

A plurality of linear spline grooves 16 (second spline grooves) corresponding to the spline grooves 7 of the screw shaft 1 are formed in the inner peripheral surface of the outer tube body 14.

Slits 17 are formed respectively in those portions of the cage 15 corresponding respectively to the spline grooves 16 of the outer tube body 14, and each slit 17 guides the spline-purpose balls 5 rolling between the two opposed spline grooves 7 and 16. Spaces each formed between the corresponding spline grooves 7 and 16 opposed to each other through the slit 17 define main passages 18A and 18B in which the spline-purpose balls 5 roll. Return passages 19 are formed in the cage 15, and each of the return passages 19 communicates with opposite (left and right) end portions of the corresponding main passage 18A, 18B.

The spline-purpose balls 5 are disposed in the main passages 18A and 18B and the return passages 19, and the spline-purpose balls 5 rolling in the main passages 18A and 18B guide a relative linear movement of the screw shaft 1 and the spline-purpose outer tube 3. Spline-purpose ball circulation passages are formed by the respective main passages 18A and 18B and the respective return passages 19. There are provided six spline-purpose ball circulation passages in all, and three pairs of first and second main passages 18A and 18B are provided, and each pair of first and second main passages 18A and 183 are disposed near to each other. With respect to the counterclockwise-side one (first main passage 18A) of the pair of main passages 18A and 18B, the return passage 19 is disposed at the counterclockwise side of this counterclockwise-side main passage 18A, whereas with respect to the clockwise-side one (second main passage 18B), the return passage 19 is disposed at the clockwise side of this clockwise-side main passage 18B. With this arrangement, a pair of spline-purpose ball circulation passages are formed by the pair of main passages 18A and 18B and the associated return passages 19, and therefore there are provided three pairs of spline-purpose ball circulation passages in all which are disposed at equal intervals in the circumferential direction.

Figure 5:
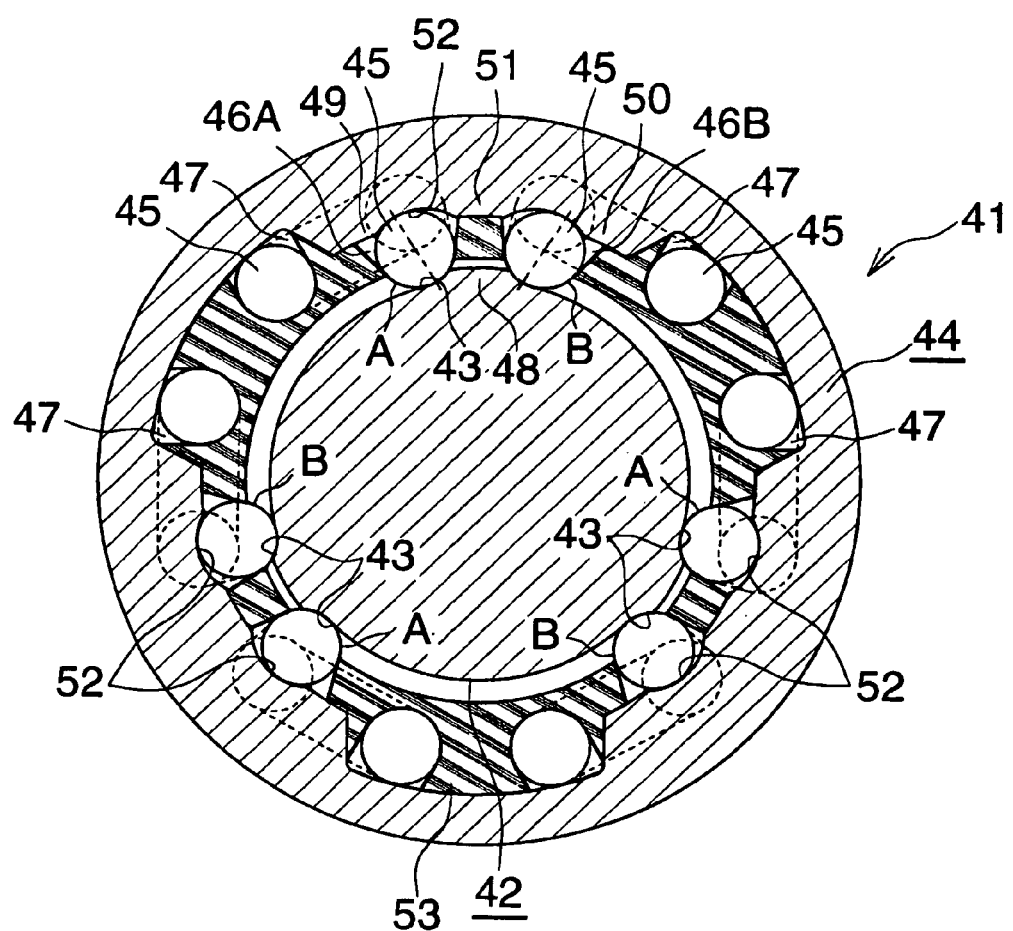
FIG. 5 is a view similar to FIG. 2, but showing a conventional ball spline-equipped ball screw.

Shoulder portions 21, 22 and 23 (first shoulder portions) are formed on the outer periphery of the screw shaft 1 such that the two adjacent shoulder portions 21 and 22 are opposed to each other in the circumferential direction with the spline groove 7 interposed therebetween and that the two adjacent shoulder portions 21 and 23 are opposed to each other in the circumferential direction with the spline groove 7 interposed therebetween. Also, shoulder portions 24, 25 and 26 (second shoulder portions) are formed on the inner periphery of the outer tube body 14 of the spline-purpose outer tube 3 such that the two adjacent shoulder portions 24 and 25 are opposed to each other in the circumferential direction with the spline groove 16 interposed therebetween and that the two adjacent shoulder portions 24 and 26 are opposed to each other in the circumferential direction with the spline groove 16 interposed therebetween. With this construction, each pair of main passages 18A and 18B of the spline-purpose ball circulation passages are formed. In the conventional construction shown in FIG. 5, each of the shoulder portions 48 (which are formed on the outer periphery of the shaft 42 so that the first main passages 46A bear only the clockwise torque while the second main passages 46B bear only the counterclockwise torque) is merely interposed between the first main passage 46A and the second main passage 46B. On the other hand, in this embodiment, the shoulder portions (intermediate shoulder portions) 21 each interposed between the first main passage 18A and the second main passage 18B are formed on the outer periphery of the screw shaft 1, and in addition the shoulder portions (counterclockwise-side shoulder portions) 22 each opposed to the first main passage 18A from the counterclockwise direction, as well as the shoulder portions (clockwise-side shoulder portions) 23 each opposed to the second main passage 18B from the clockwise direction, are formed on the outer periphery of the screw shaft 1. Further, the intermediate shoulder portions 24, the counterclockwise-side shoulder portions 25 and the clockwise-side shoulder portions 26 formed on the inner periphery of the spline-purpose outer tube 3 are different in shape from those of the conventional ball spline.

As shown on an enlarged scale in FIG. 3, the intermediate shoulder portion 21 disposed between the pair of main passages 18A and 18B has a raceway groove 21a formed at its clockwise-side portion, and also has a raceway groove 21b formed at its counterclockwise-side portion, each of the raceway grooves 21a and 21b having a predetermined radius of curvature. The counterclockwise-side shoulder portion 22 has a raceway groove 22a with a predetermined radius of curvature formed at its clockwise-side portion, and the clockwise-side shoulder portion 23 has a raceway groove 23a with a predetermined radius of curvature formed at its counterclockwise-side portion. With respect to the shoulder portions 24, 25 and 26 formed on the inner periphery of the outer tube body 14, similarly, the intermediate shoulder portion 24 disposed between the pair of main passages 18A and 18b has a raceway groove 24a formed at its clockwise-side portion, and also has a raceway groove 24b formed at its counterclockwise-side portion, each of the raceway grooves 24a and 24b having a predetermined radius of curvature. The counterclockwise-side shoulder portion 25 has a raceway groove 25a with a predetermined radius of curvature formed at its clockwise-side portion, and the clockwise-side shoulder portion 26 has a raceway groove 26a with a predetermined radius of curvature formed at its counterclockwise-side portion.

Figure 3A:
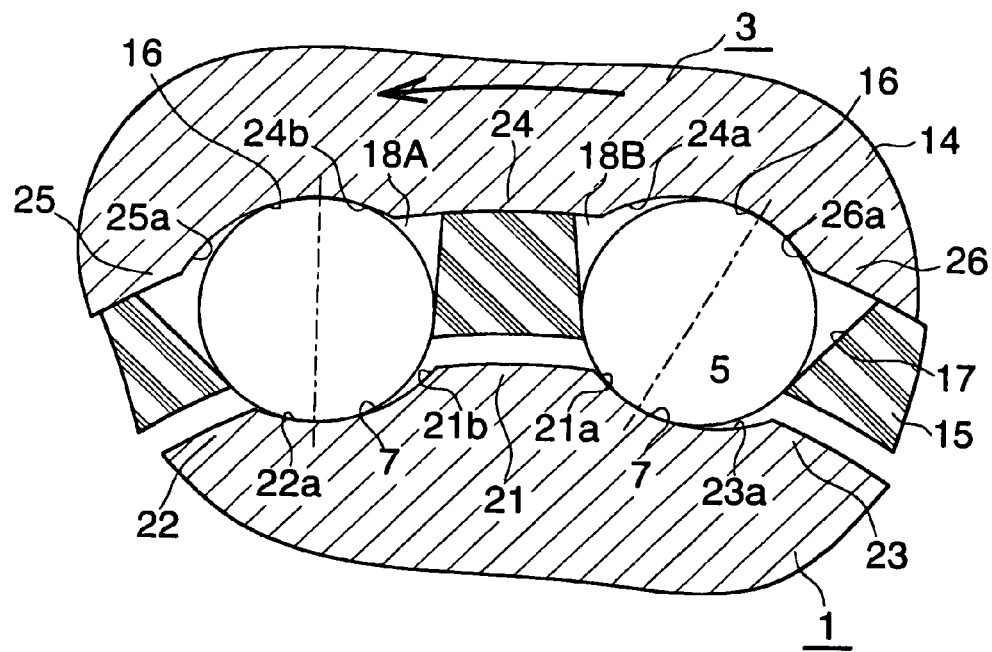
FIGS. 3A and 3B are enlarged views showing an important portion of a ball spline portion of FIG. 2.

FIG. 3A shows a condition in which a torque that is transmitted between the screw shaft 1 and the outer tube 3 acts on the spline-purpose outer tube 3 in a direction of arrow (i.e., in the counterclockwise direction). At this time, in each of the clockwise-side main passages (second main passages) 18B, this torque is borne by the clockwise-side raceway groove 21a of the intermediate shoulder portion 21 of the screw shaft 1 and the raceway groove 26a of the clockwise-side shoulder portion 26 of the outer tube body 14 opposed to the raceway groove 21a through the spline-purpose balls 5, and also in each of the counterclockwise-side main passages (first main passages) 18A, this torque is borne by the clockwise-side raceway groove 22a of the counterclockwise-side shoulder portion 22 of the screw shaft 1 and the counterclockwise-side raceway groove 24b of the intermediate shoulder portion 24 of the outer tube body 14 opposed to the raceway groove 22a through the spline-purpose balls 5.

In FIG. 3A, the raceway grooves 21a, 21b, 22a and 23a of the shoulder portions 21, 22 and 23 forming the spline grooves 7 have a radius of curvature (radius in cross section of raceway curvature) which is not smaller than 53% (usually about 52%) of the ball diameter. Similarly, the raceway grooves 24a, 24b, 25a and 26a of the shoulder portions 24, 25 and 26 forming the spline grooves 16 have a radius of curvature (radius in cross section of raceway curvature) which is not smaller than 53% (usually about 52%) of the ball diameter. With this construction, a clearance of about 5 μm is formed between the counterclockwise-side raceway groove 21b of the intermediate shoulder portion 21 of the screw shaft 1 and the spline-purpose balls 5 in the rotational direction. Similarly, a clearance of about 5 μm is formed between the raceway groove 25a of the counterclockwise-side shoulder portion 25 of the outer tube body 14 and the spline-purpose balls 5 in the rotational direction, and a clearance of about 5 μm is formed between the counterclockwise-side raceway groove 23a of the clockwise-side shoulder portion 23 of the screw shaft 1 and the spline-purpose balls 5 in the rotational direction of the screw shaft 1 and the outer tube 3, and a clearance of about 5 μm is formed between the clockwise-side raceway groove 24a of the intermediate shoulder portion 24 of the outer tube body 14 and the spline-purpose balls 5 in the rotational direction of the screw shaft 1 and the outer tube 3.

In FIG. 3A, the contact angle of the spline balls 5 relative to the raceway grooves 22a and 24b in the first main passage 18A may be different from the contact angle of the spline balls 5 relative to the raceway grooves 21a and 26a in the second main passage 18B as shown in the drawings, or these contact angles may be the same. Preferably, the construction is such that during the time when a loading torque is small, the torque is borne only by the clockwise-side main passages 18B, and when the loading torque increases to a certain level, the torque is borne also by the counterclockwise-side main passages 18A.

Figure 3B:
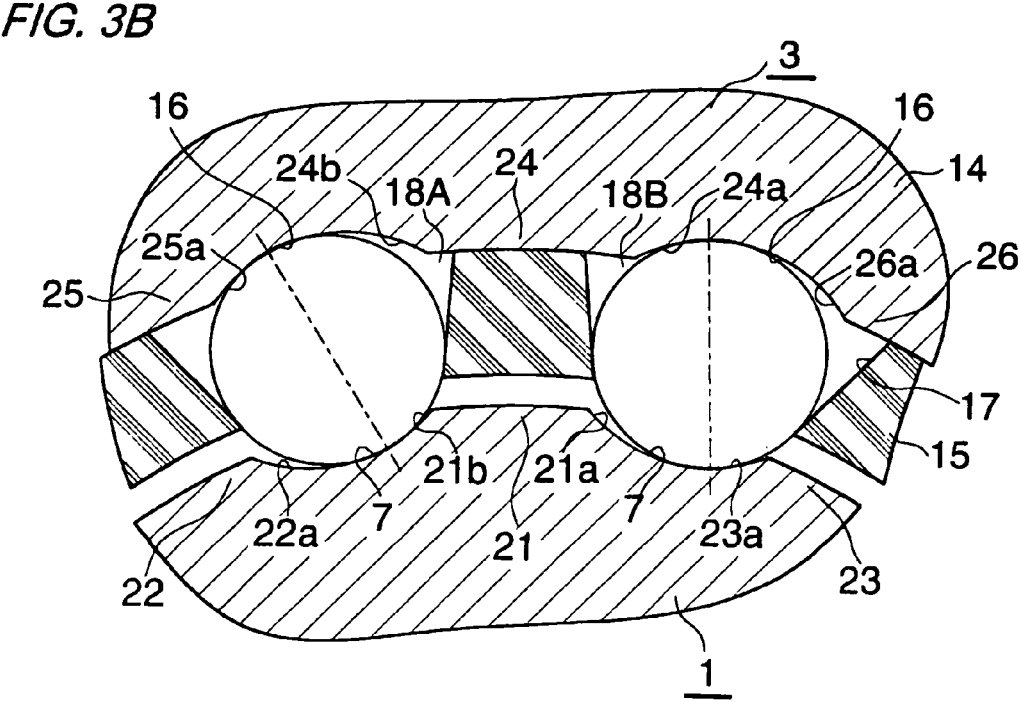

FIG. 3B shows a condition in which a torque that is transmitted between the screw shaft 1 and the outer tube 3 acts on the spline-purpose outer tube 3 in a direction (clockwise direction) opposite to the direction of arrow of FIG. 3A. In this case, in each of the counterclockwise-side main passages (first main passages) 18A, this torque is borne by the counterclockwise-side raceway groove 21b of the intermediate shoulder portion 21 of the screw shaft 1 and the raceway groove 25a of the counterclockwise-side shoulder portion 25 of the outer tube body 14 opposed to the raceway groove 21b through the spline-purpose balls 5, and also in each of the clockwise-side main passages (second main passages) 18B, this torque is borne by the raceway groove 23a of the clockwise-side shoulder portion 23 of the screw shaft 1 and the clockwise-side raceway groove 24a of the intermediate shoulder portion 24 of the outer tube body 14 opposed to the raceway groove 23a through the spline-purpose balls 5.

As described above, the raceway grooves 21a, 21b, 22a and 23a of the shoulder portions 21, 22 and 23 forming the spline grooves 7 of the screw shaft 1, as well as the raceway grooves 24a, 24b, 25a and 26a of the shoulder portions 24, 25 and 26 forming the spline grooves 16 of the outer tube body 14, have the radius of curvature (radius in cross section of raceway curvature) which is not smaller than 53% of the ball diameter. Therefore, in FIG. 3B, a clearance of about 5 μm is formed between the raceway groove 22a of the counterclockwise shoulder portion 22 of the screw shaft 1 and the spline-purpose balls 5 in the rotational direction, and a clearance of about 5 μm is formed between the counterclockwise raceway groove 24b of the intermediate shoulder portion 24 of the outer tube body 14 and the spline-purpose balls 5 in the rotational direction, and a clearance of about 5 μm is formed between the clockwise-side raceway groove 21a of the intermediate shoulder portion 21 of the screw shaft 1 and the spline-purpose balls 5 in the rotational direction, and a clearance of about 5 μm is formed between the raceway groove 26a of the clockwise-side shoulder portion 26 of the outer tube body 14 and the spline-purpose balls 5 in the rotational direction.

In FIG. 3B, the contact angle of the spline balls 5 relative to the raceway grooves 21b and 25a in the first main passage 18A may be different from the contact angle of the spline balls 5 relative to the raceway grooves 23a and 24a in the second main passage 18B as shown in the drawings, or these contact angles may be the same. Preferably, the construction is such that during the time when the loading torque is small, the torque is borne only by the counterclockwise-side main passages 18A, and when the loading torque increases to a certain level, the torque is borne also by the clockwise-side main passages 18B.

In the above ball spline-equipped ball screw, for example, the spline-purpose outer tube 3 is fixed in a predetermined position in the axial direction against rotation and axial movement, and the screw-purpose nut 2 is supported in a predetermined position in the axial direction in such a manner that this nut 2 can be rotated, but can not be moved in the axial direction. In this condition, this ball screw is used.

In this condition, when the screw-purpose nut 2 is rotated, the screw shaft 1, while guided by the spline-purpose outer tube 3, is linearly moved in the axial direction without being rotated. At this time, in the screw-purpose nut 2, the screw-purpose balls 4 rolling in the main passage 11 are changed in their advancing direction by the change-direction passage 13 in the end cap 9, and are introduced into the return passage 12, and move in and along this return passage 12 toward the other end cap 9, and then are changed in their advancing direction by the change-direction passage 13 in the other end cap 9, and are again introduced into the main passage 11. Thus, the screw-purpose balls 4 are circulated in the screw-purpose ball circulation passage. In the spline-purpose outer tube. 3, the spline-purpose balls 5 rolling in each main passage 18A, 18B are introduced into the return passage 19 through one end portion of the main passage 18A, 18B, and move in and along this return passage 19 toward the other end portion of the main passage 18A, 18B, and then are again introduced into the other end portion of the main passage 18A, 18B. Thus, the spline-purpose balls 5 are circulated in the spline-purpose ball circulation passages.

The ball spline portion is designed to bear torques acting on the spline-purpose outer tube 3 in the rotational direction, and at this time the spline-purpose balls 5 disposed in all of the main passages 18A and 18B bear the torques acting in both directions (that is, the clockwise and counterclockwise directions), and therefore the torque capacity is twice larger than that of the conventional construction, and thus the torque capacity can be increased without increasing the diameter of the shaft. In addition, when the ball spline portion bears the torque acting in either of the clockwise and counterclockwise directions, the clearances in the rotational direction exist (these will not become negative clearances), and therefore four point contact which can cause slip of the spline-purpose balls 5 is prevented, so that the life of the ball spline can be prolonged.

Figure 4:
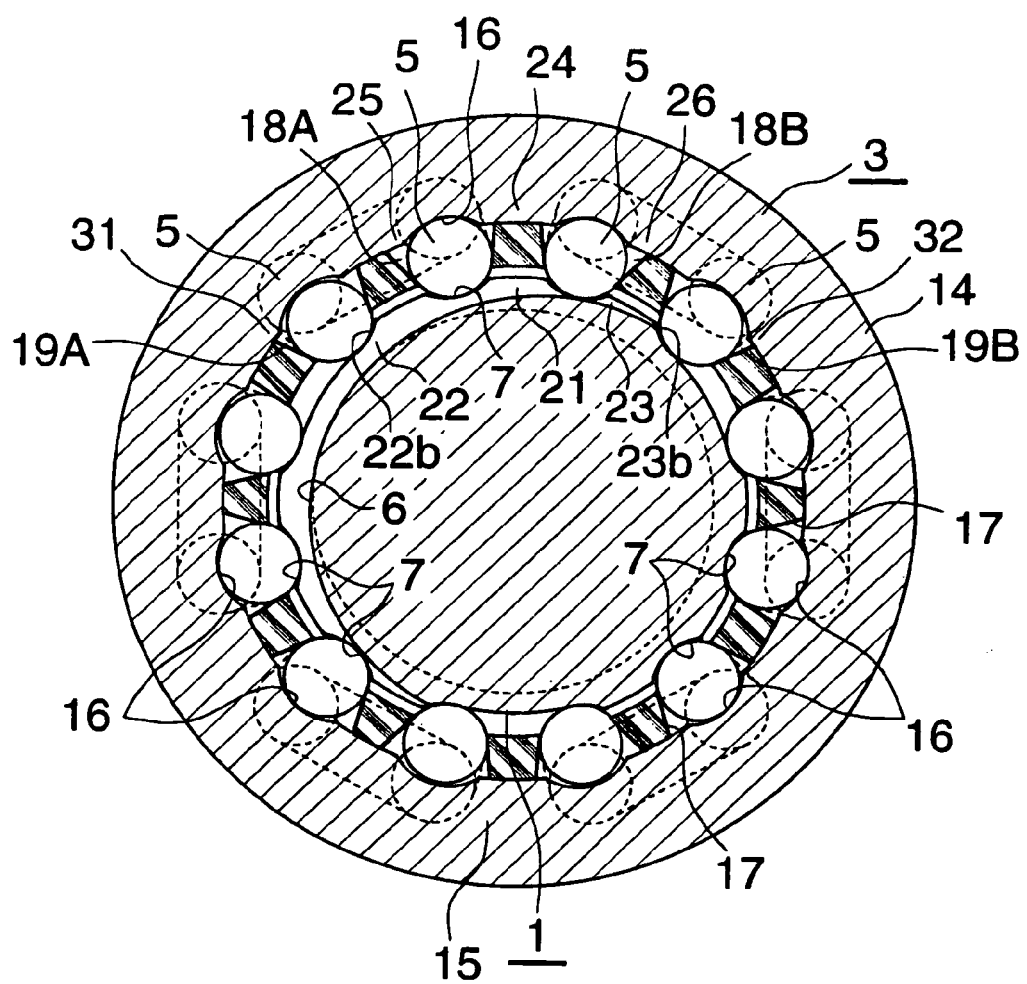
FIG. 4 is a view similar to FIG. 2, but showing a second embodiment of the invention.

FIG. 4 shows a second embodiment of a ball spline-equipped ball screw of the invention. This second embodiment differs from the first embodiment only in spline-purpose ball circulation passages. Therefore, those portions of the second embodiment similar in construction to those of the first embodiment will be designated by identical reference numerals, respectively, and description thereof will be omitted.

In this embodiment, those portions of return passages 19 (which have not heretofore borne a torque in the conventional construction) which are parallel to respective main passages 18A and 18B are substantially equal in diameter to the main passages 18A and 18B. In each return passage 19A communicating with the counterclockwise-side main passage (first main passage) 18A, a raceway groove 22b is further formed in a counterclockwise-side portion of a counterclockwise-side shoulder portion 22 of a screw shaft 1, and a shoulder portion 31 is further formed on an inner peripheral surface of an outer tube body 14 and is opposed to the counterclockwise-side shoulder portion 22 of the screw shaft 1 from the counterclockwise direction. A clockwise torque is borne also by the counterclockwise-side shoulder portions 22 and the shoulder portions 31. In each return passage 19B communicating with the clockwise-side main passage (second main passage) 18B, a raceway groove 23b is further formed in a clockwise-side portion of a clockwise-side shoulder portion 23 of the screw shaft 1, and a shoulder portion 32 is further formed on the inner peripheral surface of the outer tube body 14 and is opposed to the clockwise-side shoulder portion 23 of the screw shaft 1 from the clockwise direction. A counterclockwise torque is borne also by the clockwise-side shoulder portions 23 and the shoulder portions 32.

The shoulder portions 22 and 31 are opposed to each other generally in the circumferential direction with the return passage 19A interposed therebetween, and the shoulder portions 23 and 32 are opposed to each other generally in the circumferential direction with the return passage 19B interposed therebetween. The shoulder portions 22, 23, 31 and 32 are formed such that clearances existing respectively at these shoulder portions 22, 23, 31 and 32 in the rotational direction are larger than the clearances existing respectively at the shoulder portions 21, 22, 23, 24, 25 and 26 (for the main passages 18A and 18B) in the rotational direction (The clearances existing respectively at the shoulder portions 22, 23, 31 and the 32 remain even upon application of an ordinary torque, and are reduced upon application of an excessive torque.). As a result, when an excessive torque is applied, this torque is borne not only by the balls 5 in the main passages 18A and 18B but also by the circulating balls 5 in the return passages 19A and 19B. A half of the return passages 19A and 19B bear the clockwise torque, while the other half bears the counterclockwise torque as described above for the main passages 46A and 46B of FIG. 5.

In the ball spline-equipped ball screw of the second embodiment, when the deformation (elastic deformation) of the balls 5 in the main passages 18A and 18B increases, the circulating balls 5 in the return passages 19A and 19B can bear the torque, and by doing so, a force which will damage or break the balls 5 in the main passages 18A and 18B is prevented from acting on these balls 5.

Although the above ball spline construction is useful in the ball spline-equipped ball screw in which the ball spline portion is integrated with the ball screw portion, it can be used also in a pure ball spline structure.

The screw-purpose nut of the ball spline-equipped ball screw is not limited to the illustrated nut in the above embodiments, and can be replaced by any other suitable nut. In the above embodiments, although the end cap-type screw-purpose nut is used, the present invention can be applied also to a ball spline-equipped ball screw with a screw-purpose nut of the tube type or the deflector type. Furthermore, although the screw shaft has the single thread groove, it may have a plurality of thread grooves.

With respect to the cage 15 of the spline-purpose outer tube 3, holder portions may be provided only in those portions where the spline-purpose balls 5 are turned from the main passages 18A and 18B to the respective return passages 19.

What is claimed is:

1. A ball spline comprising:
    a shaft comprising a plurality of axially-extending linear first spline grooves formed in an outer peripheral surface thereof;
    an outer tube having the shaft passed therethrough and including second spline grooves corresponding to the first spline grooves of the shaft; and
    a plurality of balls disposed between the shaft and the outer tube,
    wherein ball circulation passages in which the balls are disposed are formed between the shaft and the outer tube by a plurality of main passages and a plurality of return passages communicating with opposite end portions of the main passages,
    wherein first shoulder portions are formed on the outer periphery of the shaft such that the first spline grooves of the shaft are interposed between the first shoulder portions adjacent to each other in a circumferential direction of the shaft so as to border both sides of the first spline grooves,
    wherein second shoulder portions are formed on the inner periphery of the outer tube such that the second spline grooves of the outer tube are interposed between the second shoulder portions adjacent to each other in a circumferential direction of the outer tube so as to border both sides of the second spline grooves,
    wherein the first and second shoulder portions and the balls are arranged such that clearances are formed respectively between the first shoulder portions and the balls and between the second shoulder portions and the balls in a rotational direction of the shaft and the outer-tube, and the balls disposed in all of the main passages bear a clockwise torque and a counterclockwise torque transmitted between the shaft and the outer tube, and
    wherein a cross section of the first spline grooves comprises a radius of curvature of 53% or more, and a cross section of the second spline grooves of the outer tube comprises a radius of curvature of 53% or more.

2. A ball spline according to claim 1, wherein portions of the return passages that are in parallel to the main passages are provided so as to be interposed between the first shoulder portions adjacent to each other in the circumferential direction of the shaft and between the second shoulder portions adjacent to each other in the circumferential direction of the outer tube, and the clearances formed between the second shoulder portions and the balls in the rotational direction in the return passages are made larger than the clearances formed in the main passages in the rotational direction so that the balls disposed in the return passages bear an excessive torque.

3. A ball spline according to claim 1, wherein the shaft comprises a screw groove formed in the outer peripheral surface thereof, and a screw-purpose nut is fitted on the shaft, and comprises a screw-purpose ball circulation passage corresponding to the screw groove, and a plurality of balls are disposed in the screw-purpose ball circulation passage of the screw-purpose nut.

4. A ball spline according to claim 1, wherein a first spline groove of the first spline grooves and a corresponding second spline groove of the second spline grooves are formed such that the balls disposed between the first spline groove and the second spline groove bear a clockwise torque and a counterclockwise torque transmitted between the shaft and the outer tube.

5. A ball spline according to claim 1, wherein a first spline groove of the first spline grooves and a corresponding second spline groove of the second spline grooves are formed such that the first spline groove and the second spline groove bear a clockwise torque and a counterclockwise torque.

6. A ball spline according to claim 1, further comprising a cage guiding the plurality of balls.

7. A ball spline according to claim 1, wherein the first shoulder portions form races on the sides of the first spline grooves, the races facing inward toward the first spline grooves.

8. A ball spline according to claim 1, wherein the second shoulder portions form races on sides of the second spline grooves, the races facing inward toward the second spline grooves.

9. A ball spline according to claim 1, wherein the ball circulation passages are formed such that, if a rotational torque is imparted on one of the first shoulder portions of a first spline groove of the first spline grooves, then a clearance is formed on an opposite first shoulder portion of the first spline groove.

* * * * *